US010275330B2

(12) United States Patent
Hirano (10) Patent No.: US 10,275,330 B2
(45) Date of Patent: Apr. 30, 2019

(54) COMPUTER READABLE NON-TRANSITORY RECORDING MEDIUM STORING PSEUDO FAILURE GENERATION PROGRAM, GENERATION METHOD, AND GENERATION APPARATUS

(71) Applicant: FUJITSU LIMITED, Kawasaki-shi, Kanagawa (JP)

(72) Inventor: Hirotsugu Hirano, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 113 days.

(21) Appl. No.: 15/298,291

(22) Filed: Oct. 20, 2016

(65) Prior Publication Data
US 2017/0132102 A1 May 11, 2017

(30) Foreign Application Priority Data
Nov. 6, 2015 (JP) .................. 2015-218286

(51) Int. Cl.
| | | |
|---|---|---|
| G06F 11/00 | (2006.01) | |
| G06F 11/26 | (2006.01) | |
| G06F 11/22 | (2006.01) | |
| G06F 11/263 | (2006.01) | |

(52) U.S. Cl.
CPC ........ G06F 11/261 (2013.01); G06F 11/2236 (2013.01); G06F 11/263 (2013.01)

(58) Field of Classification Search
CPC ... G06F 11/261; G06F 11/263; G06F 11/2236
See application file for complete search history.

(56) References Cited

U.S. PATENT DOCUMENTS

| | | | | |
|---|---|---|---|---|
| 5,787,270 A | * | 7/1998 | Bloomer | ............. G06F 11/2236 714/28 |
| 2010/0095163 A1 | * | 4/2010 | Ishihara | .............. G06F 11/2215 714/47.1 |

FOREIGN PATENT DOCUMENTS

| | | |
|---|---|---|
| JP | 62-082439 | 4/1987 |
| JP | 63-296146 | 12/1988 |
| JP | 2-196345 | 8/1990 |

(Continued)

OTHER PUBLICATIONS

Tröger et al., "Software-Implemented Fault Injection at Firmware Level", 2010, Third International Conference on Dependability 4 pages (Year: 2010).*

(Continued)

*Primary Examiner* — Michael Maskulinski
(74) *Attorney, Agent, or Firm* — Fujitsu Patent Center (57) ABSTRACT

The information processing apparatus includes a processor and components connected to the processor. In this processor, a failure occurring in any one of the processor and the components connected to the processor itself is recorded in a system space accessible in a system management mode, and an interrupt handler is notified of the occurrence of the failure by an interrupt. The program causes a management computer managing the information processing apparatus to execute shifting the processor to the system management mode, setting information indicating a pseudo failure in the system space, shifting the processor to a non system management mode from the system management mode after setting, and causing the processor to generate the interrupt corresponding to the pseudo failure.

5 Claims, 8 Drawing Sheets

(56) References Cited

FOREIGN PATENT DOCUMENTS

JP    2010-097357    4/2010

OTHER PUBLICATIONS

Duflot et al., "Using CPU System Management Mode to Circumvent Operating System Security Functions", Jan. 2001, 15 pages (Year: 2001).*

* cited by examiner

COMPUTER READABLE NON-TRANSITORY RECORDING MEDIUM STORING PSEUDO FAILURE GENERATION PROGRAM, GENERATION METHOD, AND GENERATION APPARATUS

CROSS-REFERENCE TO RELATED APPLICATIONS

This application is based upon and claims the benefit of priority of the prior Japanese Patent Application No. JP2015-218286, filed on Nov. 6, 2015, the entire contents of which are incorporated herein by reference.

FIELD

The present invention pertains to a computer readable non-transitory recording medium having stored therein a pseudo failure generation program, a pseudo failure generation method, and a pseudo failure generation apparatus.

BACKGROUND

An information system for assisting user's tasks, e.g., a backbone system, is equipped with a monitoring mechanism as a contrivance for monitoring occurrence of a failure or a sign of failure in order to ensure reliability. For example, a management terminal to manage the backbone system is provided for monitoring an information processing apparatus instanced by a monitoring target server within the backbone system by using a monitoring program. On the other hand, the monitoring target information processing apparatus is equipped with a mechanism to notify and record the failure or the sign of failure. The management terminal and the failure notifying/recording mechanism cooperate to configure the monitoring mechanism. The reliability of the information processing apparatus or the backbone system including the information processing apparatus can be ensured by checking an operation of the monitoring mechanism or verifying a function thereof. The check of the operation of the monitoring mechanism or the verification of the function thereof connotes checking a normal operation of a process of the monitoring mechanism to detect the failure or the sign of failure of the information processing apparatus, and notify a detected result to an external device instanced by the management terminal. The sign of failure connotes occurrence of a correctable error, occurrence of a recoverable failure not reaching a stop of the information processing apparatus, or that an occurrence count of correctable errors exceeds a certain threshold value. The management terminal detects the sign of failure, thereby providing information enabling an administrator of the information processing apparatus to determine to some extent when performing a maintenance work of the information processing apparatus and exchanging components thereof. It will hereinafter be simply called the verification of the monitoring mechanism to check the operation of the monitoring mechanism or verify the function thereof.

By the way, a vendor of the information processing apparatus develops the information processing apparatus including a processor installed in the information processing apparatus or the backbone system and other equivalent systems, in which case an operator of the vendor, the administrator and other equivalent persons can conduct the verification of the monitoring mechanism even after the information processing apparatus will have been shipped from a business place of the vendor and installed at a user site. For example, the vendor of the information processing apparatus incorporates a dedicated equipment instanced by a pseudo failure generation circuit into a self-processor, thereby enabling the verification of the monitoring mechanism for monitoring the information processing apparatus by generating a pseudo failure or a pseudo sign of failure at the user site as well.

DOCUMENTS OF PRIOR ARTS

Patent Documents

[Patent Document 1] Japanese Patent Application Laid-Open Publication No. H2-196345
[Patent Document 2] Japanese Patent Application Laid-Open Publication No. S62-82439
[Patent Document 3] Japanese Patent Application Laid-Open Publication No. 2010-97357
[Patent Document 4] Japanese Patent Application Laid-Open Publication No. S63-296146

SUMMARY

One aspect of the present invention is exemplified by a computer readable non-transitory recording medium having stored therein a program for generating a pseudo failure in an information processing apparatus. The information processing apparatus includes a processor and components connected to the processor. In this processor, a failure occurring in any one of the processor and the components connected to the processor itself is recorded in a system space accessible in a system management mode, and an interrupt handler is notified of the occurrence of the failure by an interrupt. The program causes a management computer to manage the information processing apparatus to execute shifting the processor to the system management mode, setting information indicating a pseudo failure in the system space, shifting the processor to a non system management mode from the system management mode after setting, and causing the processor to generate the interrupt corresponding to the pseudo failure.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

An information system according to one embodiment will hereinafter be described with reference to the drawings. The information system includes an information processing apparatus and an management terminal to manage the information processing apparatus. The information processing apparatus is exemplified by a server. The information system has a monitoring mechanism that monitors the information processing apparatus. When a failure or a sign of failure occurs in a processor or other components within the information processing apparatus, the monitoring mechanism processes the failure or the sign of failure. The failure is also called an error. The sign of failure is defined as an event not reaching a system stop called a system down and connotes an event suggesting and predicting a prospective occurrence of the failure. The sign of failure can be instanced by a correctable error and other equivalent events.

The information system has a generation mechanism to generate a pseudo failure or a pseudo sign of failure of hardware in order to verify the monitoring mechanism. The pseudo failure or the pseudo sign of failure of the hardware are generically called a pseudo failure sign. The pseudo failure sign does not mean that the hardware of the information processing apparatus actually generates the failure or the sign of failure, but can be said to be information indicating the hardware failure or sign of failure, which is generated in a pseudo manner by the generation mechanism. The pseudo failure sign can be also said to be simply the pseudo failure.

The information processing apparatus of the information system includes inside a management unit to manage the information processing apparatus. In the embodiment, the management unit is provided with a control to write sign information indicating the occurrence of the pseudo failure sign to a system space. The management unit receives, e.g., a specified command issued by the management terminal to manage the information processing apparatus. Based on an instruction content of the specified command, the management unit writes the sign information to the system space, and notifies the occurrence of the pseudo failure sign to an interrupt handler of BIOS by an interrupt. The interrupt handler acquires the sign information written to the system space, and notifies the management unit of this sign information. The management unit further notifies the management terminal of the sign information. Thus, the monitoring mechanism of the information system includes the interrupt handler of the BIOS, the management unit, and the management terminal. The sign information can be normally processed by the monitoring mechanism, in which case it follows that a function of the monitoring mechanism is verified. The information system in the embodiment thus universally verifies the monitoring mechanism, based on an input of the specified command from the management terminal.

Comparative Example

Figure 1:
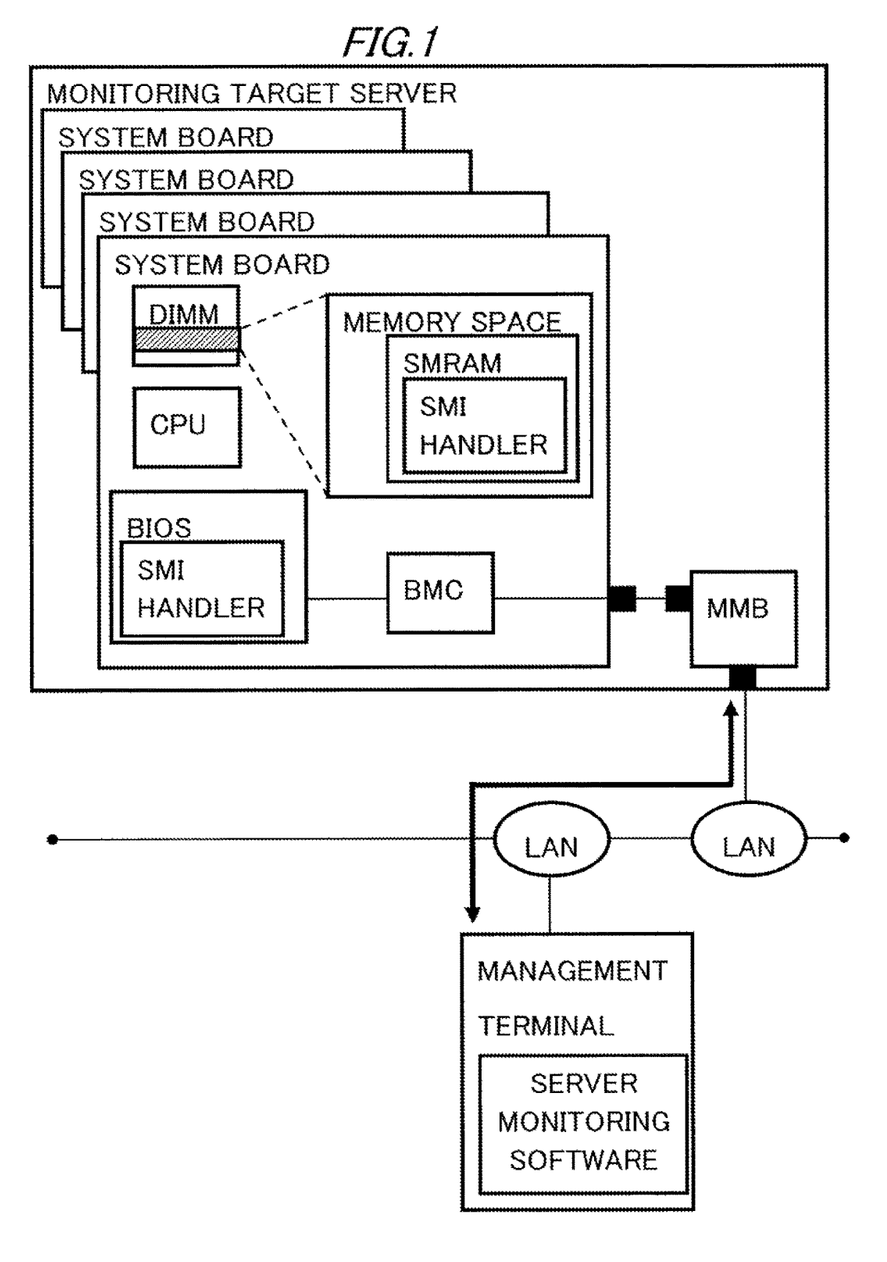
FIG. 1 is a diagram illustrating a failure monitoring process of a server equipped with a CPU.
Figure 2:
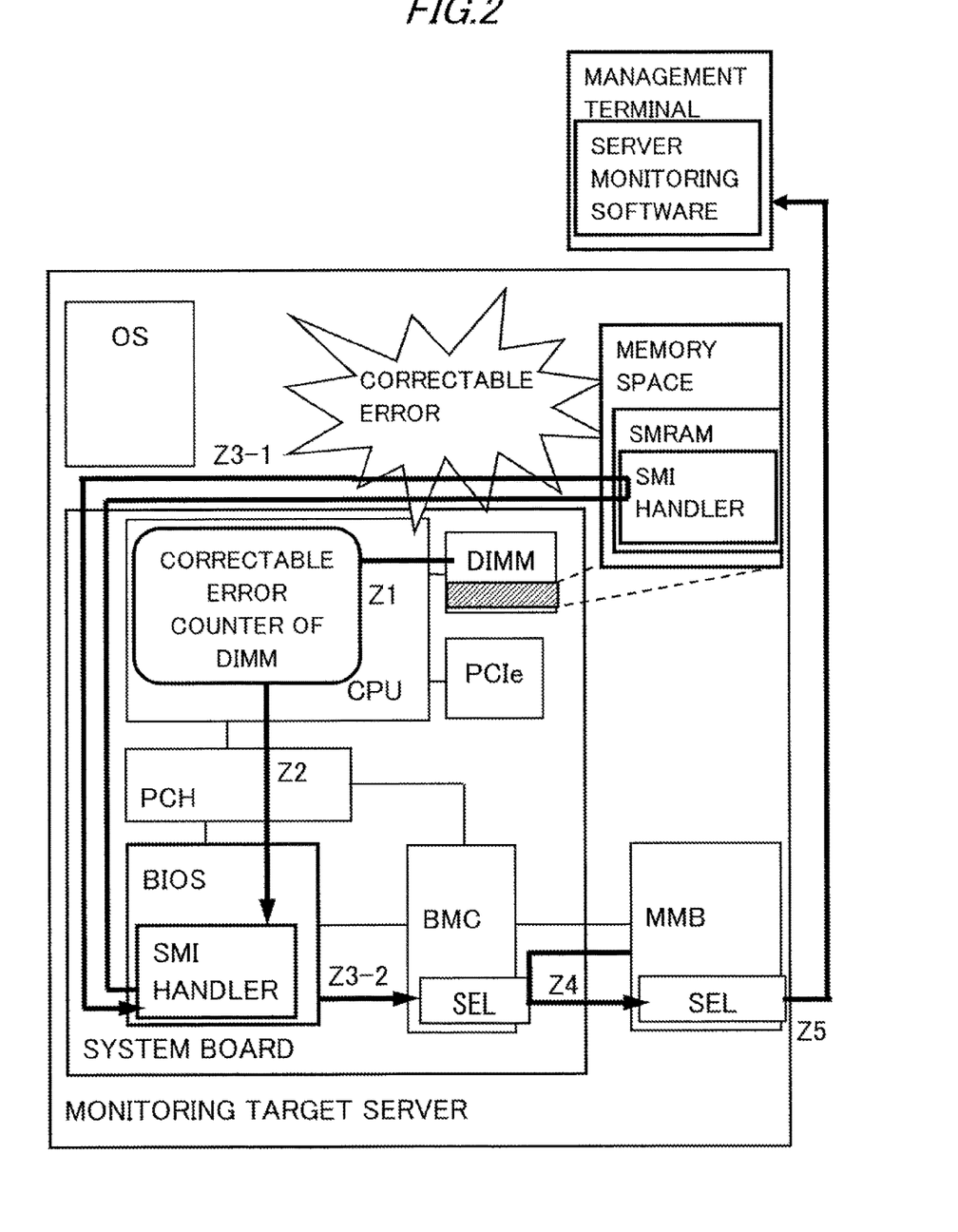
FIG. 2 is a diagram illustrating a failure sign process in a DIMM.
Figure 3:
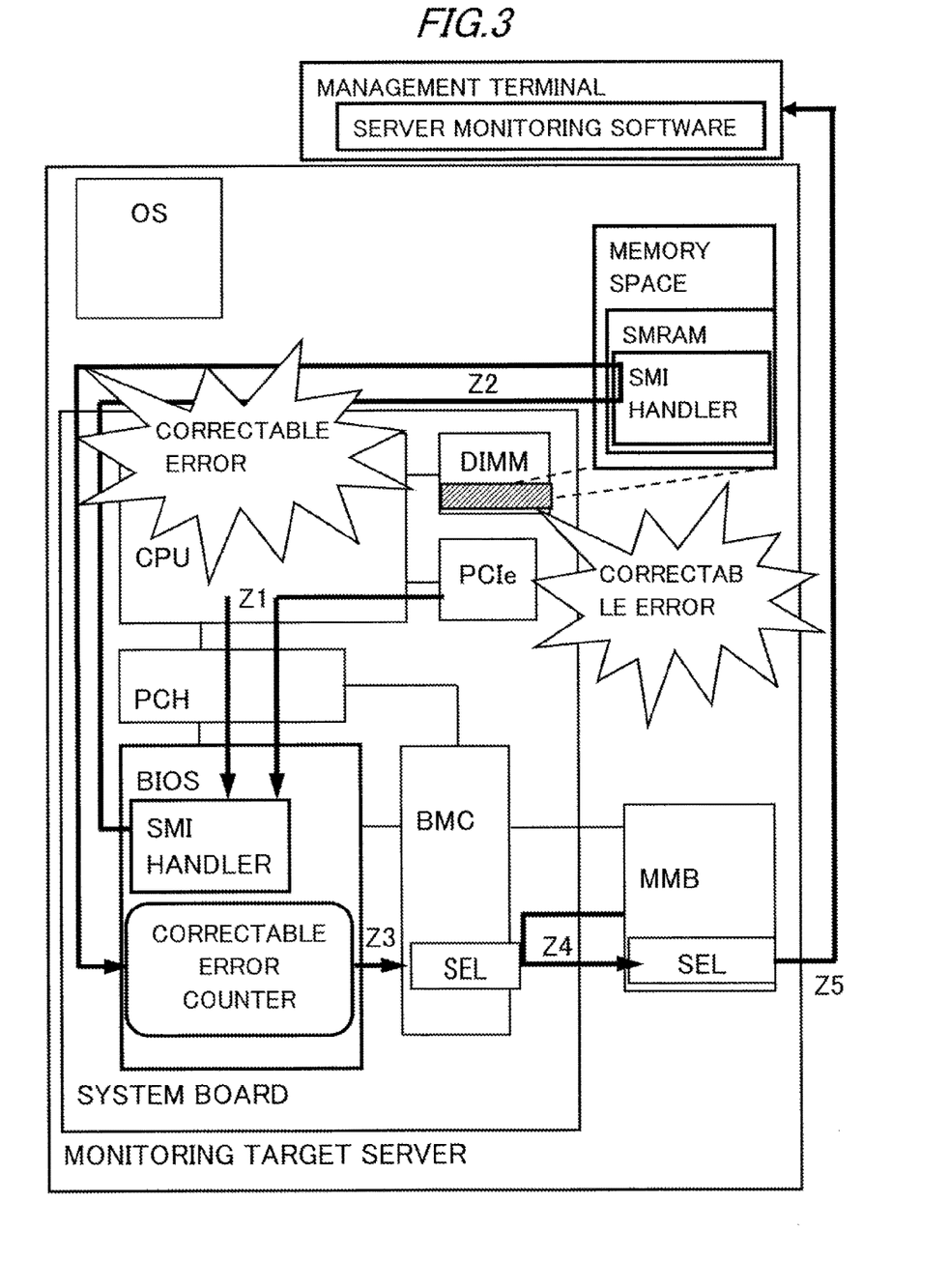
FIG. 3 is a diagram illustrating the failure sign process in an I/O unit.

The information system in a comparative example will be exemplified with reference to FIGS. 1 through 3. FIG. 1 is a diagram illustrating a failure monitoring process of a server equipped with a Central Processing Unit (CPU) based on an x86 architecture of Intel Corporation. FIG. 1 illustrates a monitoring target server and the management terminal connected to the monitoring target server via a Local Area Network (LAN). The monitoring target server includes a plurality of system boards, and a server management unit (Management Board, which will hereinafter be abbreviated to "MMB") to mange the system boards. Each system board includes a CPU, a Dual Inline Memory Module (DIMM), a Read Only Memory (ROM) that stores Basic Input/Output System (BIOS), and a Baseboard Management Controller (BMC).

The monitoring target server has a mechanism to notify and record an error. For example, when the error occurs in components instanced by the CPU and the DIMM, an error process is carried out as below. Upon detecting the error, each component notifies the CPU of the error through one kind of interrupt termed a System Management Interrupt (which will hereinafter be abbreviated to "SMI"). When receiving the SMI, the CPU shifts to a System Management Mode (which will hereinafter be abbreviated to "SMM") defined as one of operation modes. Upon shifting to the SMM, the CPU execute an SMI handler within the BIOS. The SMI handler is a program to process the SMI in a System Management Random Access Memory (which will hereinafter be abbreviated to "SMRAM") space. The SMRAM space is an independent address space within a memory space, and disables accesses in the operation modes other than the SMM. An error location is specified through processing by the SMI handler, and the BIOS is notified of a suspicious location. When finishing the process of SMI handler, the CPU comes to an end of the SMM mode and returns to the operation mode before shifting.

The BIOS is started up on the CPU and causes the BMC to record an error log. The BIOS reports a failure to an administrator visually by causing the MMB to light up a failure lamp and other equivalent alarms. The BIOS carries out log/notification on a screen of server monitoring software on the management terminal. The MMB is connected to the management terminal via, e.g., a Local Area Network (LAN). The MMB notifies the management terminal of a hardware abnormal log (temperature, voltage and other equivalent items), a hardware failure log (CPU/DIMM/HDD/PSU/FAN, and other equivalent components) and a hardware failure sign log (failure signs of CPU/DIMM/PCIe and other equivalent components).

The BMC is a controller chip for managing the server, which is mounted on a system board 10. The BMC, of which a power source is managed separately from a main body, monitors the hardware (CPU, memory, temperature sensor, and other equivalent components), conducts remote control, and records hardware events, and performs communications with the management terminal. In other words, a BMC enables the basic remote control not depending on an operating status of the server from outside, e.g., the MMB, the management terminal and other equivalent external devices. An Intelligent Platform Management Interface (IPMI) defines a standard specification of the BMC.

The server requested to have high reliability enables the BMC or the BIOS to monitor a threshold value of the correctable error with respect to the components instanced by the CPU and DIMM in order to attain the higher reliability. The correctable error is instanced by an error correctable data error.

The BMC or the BIOS, upon detecting a component with en correctable error occurrence count exceeding a threshold value during a fixed period, transmits a log or notification about the component to the management terminal, and prompts the administrator to replace this component. Through such threshold value monitoring, the monitoring target server in FIG. 1 is contrived to enable prevention of a stop of the information system due to a critical hardware failure. The threshold value monitoring is also called sign monitoring.

For implementing the correctable error threshold value monitoring, the CPU, designed for a high-performance server, of Intel Corporation, has a function to notify the BIOS of the errors of the CPU and the DIMM before giving the notification to the OS. The BIOS receiving the notification can take a recovery mechanism or can record the error log in firmware instanced by the BMC. In other words, the correctable error threshold value monitoring can be conducted within the BIOS or the BMC.

FIG. 2 illustrates a failure sign process in the DIMM. The monitoring target server in FIG. 2, similarly to FIG. 1, uses the general purpose CPU based on the x86 architecture. In FIG. 2, the ROM storing the BIOS and the BMC are connected to the CPU via a chipset Platform Controller Hub (PCH). The CPU, upon detecting the correctable errors of the DIMM, counts an occurrence count of the correctable errors of the DIMM (arrow line Z1). When the occurrence count exceeds the threshold value, the CPU notifies an SMI interrupt to the SMI handler of the BIOS (arrow line Z2). The SMI handler specifies a location of the DIMM with the occurrence count exceeding the threshold value by accessing the SMRAM (arrow line Z3-1), and records a log indicating the failure sign about the specified location within the DIMM in a System Event Log (SEL) within the BMC (arrow line Z3-2). The MMB periodically collects the SEL of the BMC, and hence the log indicating the failure sign is recorded in the MMB (arrow line Z4). The MMB informs the management terminal of the failure sign through a Simple Network Management Protocol (SNMP) trap (arrow line Z5).

FIG. 3 illustrates the failure sign process in the CPU or an input/output unit of a Peripheral Component Interconnect (PCI) Express (PCIe) and other equivalent interfaces. The monitoring target server in FIG. 3, similarly to FIGS. 1 and 2, uses the general purpose CPU based on the x86 architecture. The CPU or the I/O unit of the PCIe and other equivalent interfaces, upon detecting the correctable error, notifies the SMI handler of the SMI interrupt (arrow line Z1). The SMI handler in the BIOS, upon accepting the SMI interrupt, specifies the occurrence location of the correctable error by accessing the SMRAM, and reports the occurrence location to the BIOS (arrow line Z2). The BIOS counts the correctable error occurrence count of each of the CPU, the I/O unit and other equivalent components by using an a correctable error counter. When the occurrence count exceeds the threshold value, the BIOS records the failure sign log in the SEL within the BMC (arrow line Z3). The MMB periodically collects the logs of the BMC, and hence the failure sign logs are recorded on the MMB (arrow line Z4). The MMB informs the management terminal of the failure sign through the SNMP trap (arrow line Z5).

As illustrated in FIGS. 1 through 3, the server equipped with the general-purpose CPU based on the x86 architecture is equipped with the function to monitor the failure and the sign. However, when the server verifies the function, e.g., the monitoring function to monitor the failure or the sign of the CPU and the DIMM, the correctable error is generated in the pseudo manner within the server. Therefore, for instance, a function to generate a pseudo failure, a pseudo sign and other equivalent pseudo events is incorporated into circuits of the CPU, the DIMM, the I/O units and other equivalent devices. A dedicated device for generating the pseudo failure, the pseudo sign and other equivalent pseudo events, is connected to an interface of the CPU or the I/O unit.

However, as in the case of building up the system on a user site, the following problem arises on a site other than a vendor's business place of the information system.

The use of the dedicated device and the pseudo generation circuit is not a simple matter in verifying the notification of the failure sign. This is because a conventional dedicated device and a conventional pseudo generation circuit have no universality enabling anybody to use in many cases. Consequently, the use of the dedicated device and the pseudo generation circuit entails installing or uninstalling the device by an operator, the administrator and other equivalent persons having knowledge about the dedicated device and the pseudo generation circuit. In other words, it follows that the operator, the administrator and other equivalent persons conduct the work after recognizing the hardware processing on the occurrence of the occurrence of the error, the specification of the interface and other equivalent items.

Such a method is also considered that the pseudo failure or the pseudo sign is generated not by the dedicated device but by a computer program. For example, an assumption is that a pseudo error code different from a normal error code for a fault is separately prepared, the CPU of the information processing apparatus executing the computer program generates the pseudo error code, and the OS or the monitoring mechanism of the information processing apparatus is notified of this pseudo error code. However, in the case of using the pseudo error code, it follows that the pseudo error is processed by a processing routine dedicated to the pseudo error different from when the error occurs in the normal hardware. Consequently, recurrence of the error processing of the normal hardware in the monitoring mechanism is unable to be attained as the case may be. Such a mechanism is prepared on a computer program basis, in which case a routine for processing the pseudo code needs preparing per OS, and this results in a large increase in number of development steps in the server using the CPU based on the x86 architecture that supports a variety of OSs.

Such being the case, a contrivance is desirable, which is usable outside like the user site other than the vendor's business place of the information processing apparatus, also usable universally without having enough technical knowledge and skill, and enables the pseudo failure sign to be generated by a similar mechanism to that for the actual error.

The following embodiment provides a function to cause the MMB to generate the pseudo failure or the pseudo sign in the monitoring target server by instructing the management unit instanced by the MMB from outside of the server without depending on the physical dedicated device and a usage environment (OS). For instructing the MMB from outside of the server, a discrete device like the management terminal is enabled to issue an instruction command for generating the pseudo failure to the monitoring target MMB via a network.

The following embodiment adopts neither displaying the dedicated message for the pseudo failure nor executing the dedicated routine for the pseudo failure, but the processing unit for the same processes as the normal failure process and the normal sign process is contrived to process the pseudo failure sign. The following embodiment therefore adds a contrivance for executing the normal error process without incorporating the dedicated device and the dedicated circuit.

For example, in the server using the general CPU, based on the x86 architecture, of Intel Corporation, the SMI handler of the BIOS executes the failure process. This being the case, in the following embodiment, the MMB of the monitoring target server notifies the BIOS of an interrupt against the pseudo failure, and the SMI handler starts processing and thus specifies a pseudo failure location. Processes from the suspicious location identifying process of the SMI handler onward are the same as those in the normal failure sign process.

Embodiment

An information system of the embodiment will hereinafter be described with reference to FIGS. 4 through 7B. The information system includes a monitoring target server 1 and a management terminal 2.

Configuration

Figure 4:
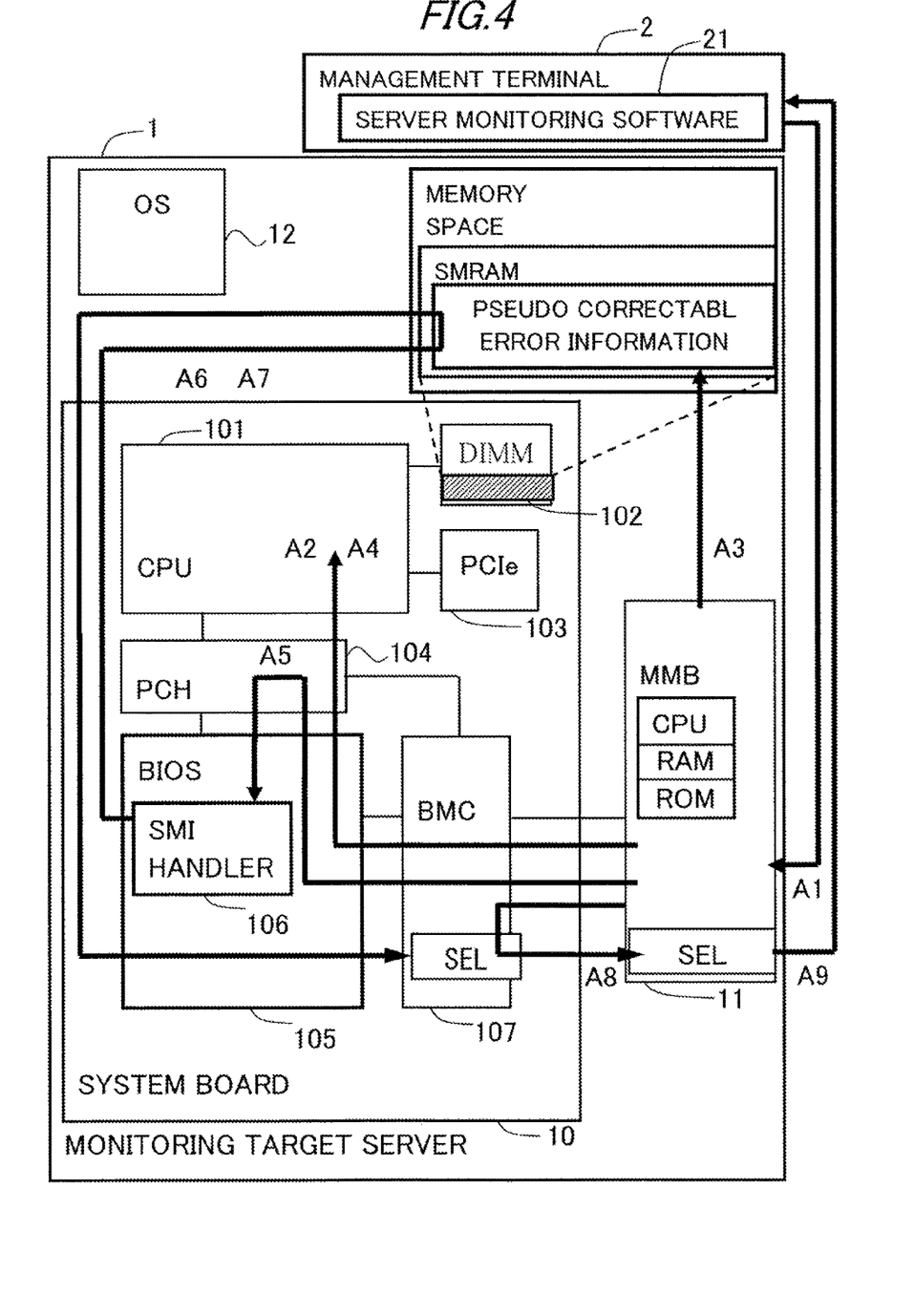
FIG. 4 is a diagram illustrating an information system including a monitoring target server and a management terminal.

FIG. 4 is a diagram illustrating the information system including the monitoring target server 1 and the management terminal 2 in the embodiment. The monitoring target server 1 includes one or a plurality of system boards 10 and an MMB 11. Each system board 10 includes a CPU 101, a DIMM 102, a PCI Express (PCIe) interface 103, a PCH 104, a ROM 105 to store the BIOS, and a BMC 107.

The CPU 101 is one example of a "processor". At least one of the DIMM 102, the PCIe 103 and a peripheral device connected to the PCIe 103 is one example of a "component". The MMB 11 is one example of a "management computer". The MMB 11 is also one example of a "pseudo failure generation device". The server 1 is one example of an "information processing apparatus". The management terminal 2 is one example of an "external device".

The MMB 11 manages one or the plurality of system boards 10 within the monitoring target server 1, and acquires failure information or failure sign information in the system boards 10. The MMB 11 has a dedicated CPU and memories (RAM, ROM), whereby MMB firmware runs. The CPU of MMB 11 is one example of "another processor".

The MMB firmware provides a Web user interface via the network, and enables the connected management terminal 2 to manage and operate the monitoring target server 1. The MMB 11 executes, e.g., extracting logs from the BMC 107, displaying the logs on the management terminal 2, and informing the management terminal 2 of an event (E-mail notice, SNMP trap). Note that the firmware in the MMB 11 may be updated via, e.g., the network.

The CPU 101 is mounted on the system board 10 and is connected to respective components instanced by the DIMM 102 and the PCIe 103. The CPU 101 is connected to the PCH 104, and the PCH 104 is connected to the ROM 105 storing the BIOS and to the BMC 107. Note that the PCH 104 is also called a chipset. Each of the BMC 107 and the MMB 11 has an area for recording a System Event Log (which will hereinafter be abbreviated to "SEL") of the monitoring target server 1. The MMB 11 periodically acquires the log information of the BMC 107, and the logs thereof are recorded within the MMB 11. The MMB 11 has an external communication unit for the network between the apparatuses, and is thereby enabled to perform communications with the management terminal 2. Accordingly, the management terminal 2 can monitor a status of the monitoring target server 1 via the network and the MMB 11. The BMC 107 is the same as in FIGS. 1 through 3, and hence a detailed description thereof is omitted.

The management terminal 2 is preinstalled with a monitoring program for monitoring the monitoring target server 1. When a power source of the server 1 is started up, the MMB 11 acquires on-board component information (containing on-board slot locating information) and is to have a function to retain the acquired information.

Figure 6:
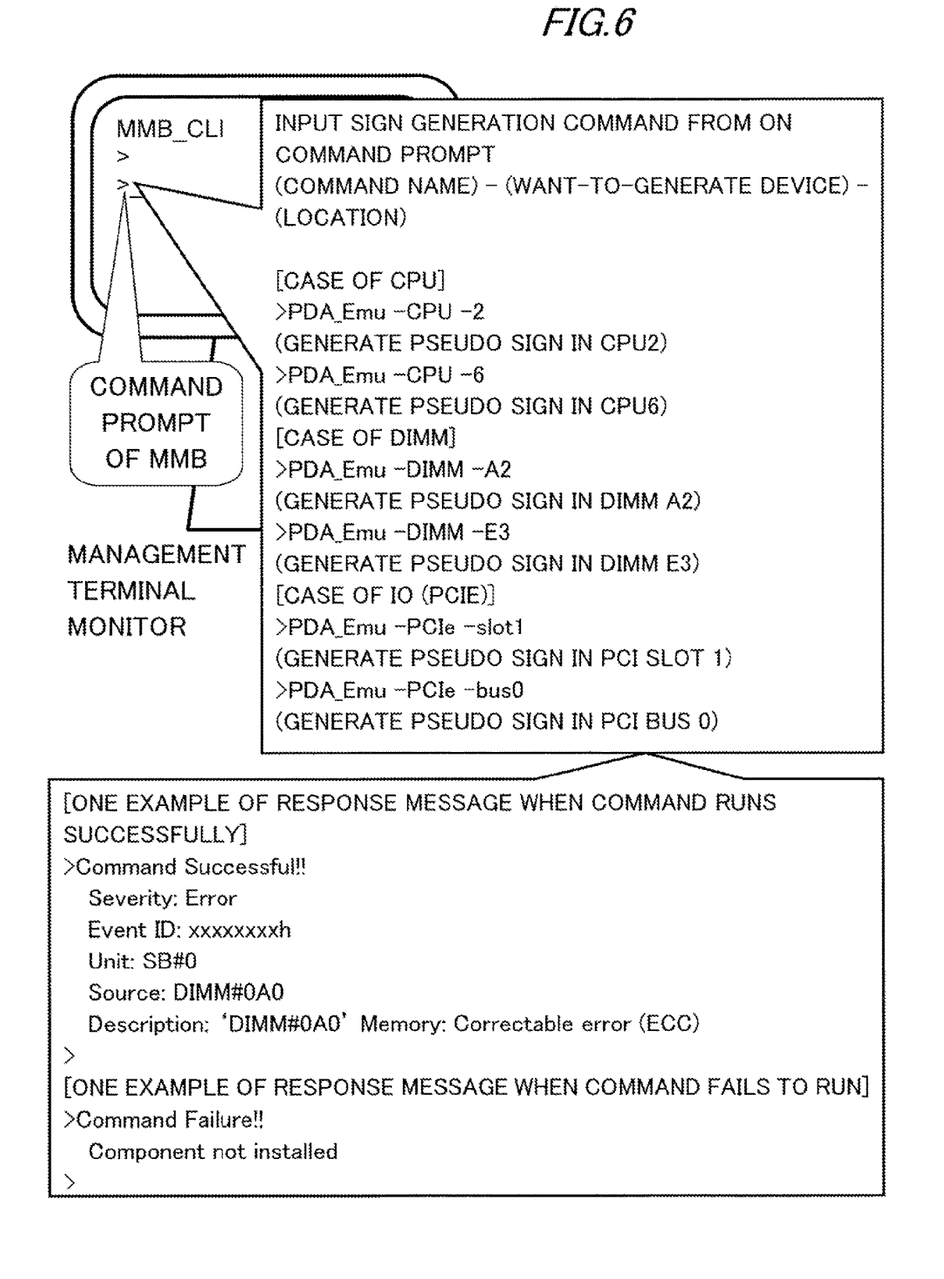
FIG. 6 is a diagram illustrating a command input screen of an MMB, which is displayed on the management terminal.

For generating the pseudo failure or the pseudo sign, an administrator of the information system opens a command prompt on the MMB 11 to input a command, and inputs a pseudo sign generation instruction (see FIG. 6).

Figure 5:
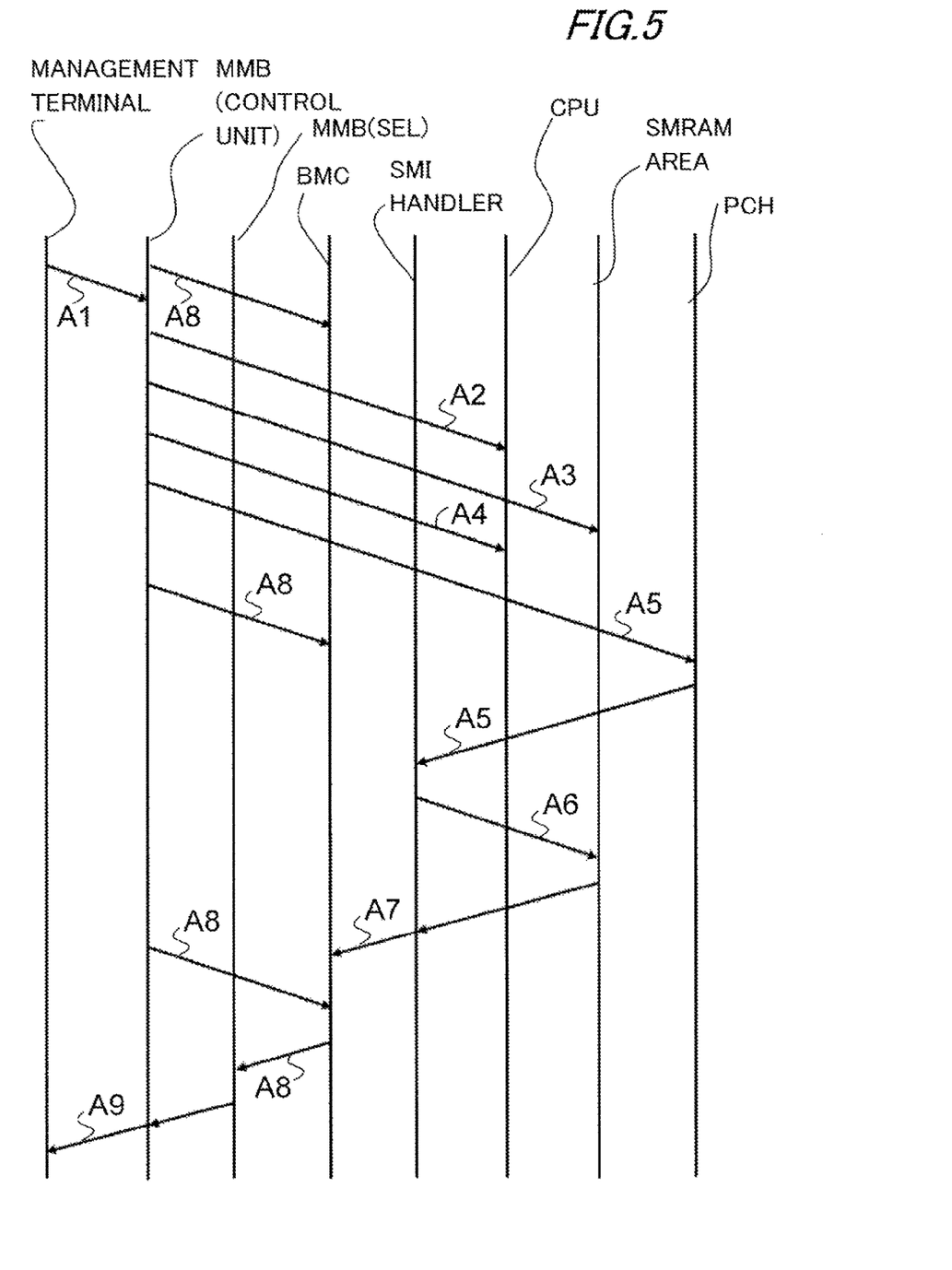
FIG. 5 is a time chart indicating a processing sequence of the information system.

FIG. 5 is a time chart indicating a processing sequence of the information system in FIG. 4. Processes after issuing the command will be described based on a code sequence (An, n=1, 2, . . . ) in the schematic diagram of FIG. 4 and the time chart of FIG. 5. Note that arrow lines marked with the same symbols on the sequence in FIG. 5 as the symbols in FIG. 4 indicate the same processes.

Arrow line A1: The management terminal 2 accepting the operation of the administrator issues a pseudo failure sign generation command to the MMB 11. The pseudo failure sign generation command contains a designation of a pseudo failure sign generation target component (which is also called the CPU, the part and the device), and a designation of the location. The location is instanced by an interface number possessed by the CPU 101, identifying information of the PCIe, a bus address and identifying information for identifying a slot of the DIMM. The location is also called on-board locating information. The process indicated by the arrow line A1 is one example of "accepting a command designating a pseudo failure generating location to generate the pseudo failure from an external device connected to a management computer".

Arrow line A2: The MMB 11 accepting the command checks the on-board locating information of the component possessed by the MMB 11 itself against the location designated by the command. The MMB 11 determines, based on this checking, whether the component designated by the command is an actual on-board component. When the component designated by the command is the actual on-board component, the MMB 11 changes a register of the CPU 101 to an accessible status to the SMRAM area via the BIOS. More specifically, in the case of the CPU based on the architecture of the Intel Corporation, the MMB 11 sets a D_OPEN bit of a System Management RAM Control (SMRAMC) register. When the D_OPEN bit of the SMRAM control register is set to "1", a transfer destination of a memory access is changed to the SMRAM area. The process indicated by the arrow line A2 is one example of "shifting a processor to a system management mode". The SMRAM area is one example of a "system space".

Arrow line A3: The MMB 11 writes the pseudo failure sign information to the accessible SMRAM area. The pseudo failure sign information contains elements specifying which component the error exists in and what kind of error occurs. The process indicated by the arrow line A3 is one example of "setting information indicating a pseudo failure in a system space".

Arrow line A4: The MMB 11 rewrites again the SMRAM control register of the CPU, which has been rewritten in the process indicated by the arrow line A2, and changes the SMRAM area to an unaccessible status. The process indicated by the arrow line A4 is one example of "shifting the processor to a non system management mode from a system management mode".

Arrow line A5: The MMB 11 generates the SMI interrupt via the BIOS, and shifts the CPU to an SMM mode. In the case of the PCH of the Intel Corporation, the SMI interrupt is generated by setting an Advanced Power Management (APM) Control Port Register (APM_CNT-Advanced Power Management Control Port Register), and the CPU 101 shifts to the SMM mode. The process indicated by the arrow line A5 is one example of "causing the processor to generate an interrupt corresponding to the pseudo failure".

Arrow line A6: With the SMI interrupt, the SMI handler 106 of the BIOS is started up by the CPU 101, and starts identifying a failure location. Processes from this process onward are the same as those in the normal error process. The SMI handler 106 is one example of an "interrupt handler".

Arrow line A7: The SMI handler 106 reads the pseudo failure sign information written in the process indicated by the arrow line A3 from the SMRAM area, identifies a pseudo failure location, and causes the BMC 107 to record a failure sign log in the SEL within the BMC 107.

Arrow line A8: The MMB 11 periodically collects the logs of the BMC 107, therefore acquires the failure sign logs from the BMC 107, and records the acquired logs in the SEL within the MMB 11. The arrow line A8 in FIG. 5 indicates that the MMB 11 periodically collects the logs of the BMC 107. The process indicated by the arrow line A8 is one example of "acquiring failure information output by the interrupt handler started up upon the interrupt".

Arrow line A9: The MMB 11 informs the failure sign to the monitoring program of the management terminal 2 through the SNMP trap. The SNMP trap is a notice that is actively transmitted toward the computer for the management from an equipment under the monitoring when monitoring the equipment on the network. The SNMP is a protocol for the management computer to monitor and control via the network a variety of equipments instanced by routers, computers and terminals in a Transmission Control Protocol/Internet Protocol (TCP/IP) network. When an abnormal state designated beforehand by a node on the network occurs and when such an event occurs that a parameter representing a status of the node exceeds a preset threshold value, an occurrence node issues the SNMP trap to the computer and other equivalent equipments monitoring the node. The process indicated by the arrow line A9 is one example of "notifying the external device of the acquired failure information".

FIG. 6 is a diagram illustrating a command input screen of the MMB 11, which is displayed on the management terminal 2. The administrator desiring to generate the pseudo failure sign inputs a pseudo failure sign generation command to the command input screen of the MMB 11. A command is formatted such as "command name"—"want-to-generate device name"—"location". For instance, in the case of generating the pseudo failure sign in the second CPU of the plurality of existing CPUs, the administrator inputs ">PDA_Emu-CPU-2". In the case of generating the pseudo failure sign in the slot A3 of the DIMM, the administrator inputs ">PDA_Emu-DIMM-A3". In the case of generating the pseudo failure sign in the slot 1 of the PCIe, the administrator inputs ">PDA_Emu-PCIE-slot1". In the case of generating the pseudo failure sign in the bus 0 of the PCIe, the administrator inputs ">PDA_Emu-PCIE—bus0".

When the administrator inputs the pseudo failure sign generation command, the MMB 11 outputs a response message to the management terminal 2. When the pseudo failure sign generation command is successfully executed, the response message goes like this: command executing successful wording (Command Successful!!), generated pseudo failure sign level (Severity: Error), pseudo failure sign event ID, unit identifying information (UNIT:SB #0) of component of generating location, generation originating location (DIMM #0A0) and description (Description: "DIMM #0A0" Memory Correctable error(ECC)). Whereas when the pseudo failure sign generation command fails, the response message goes like this: command failure wording (Command Failure!!), and cause of failure (Component not installed). The pseudo failure sign generation command fails to run when, e.g., a non-existing device or location is designated, and in other equivalent cases.

Figure 7A:
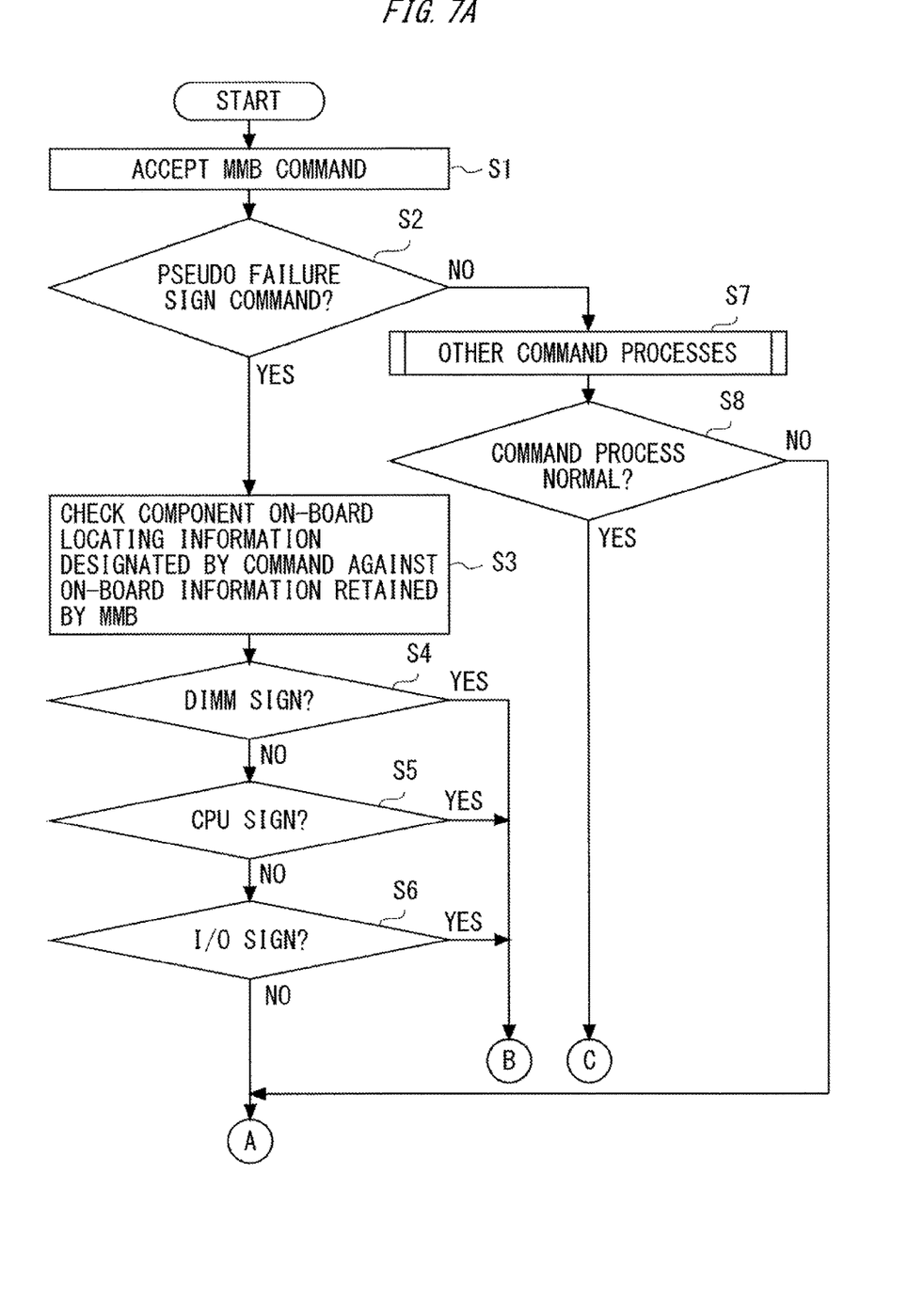
FIG. 7A is a flowchart illustrating a process for a pseudo failure sign generation command.
Figure 7B:
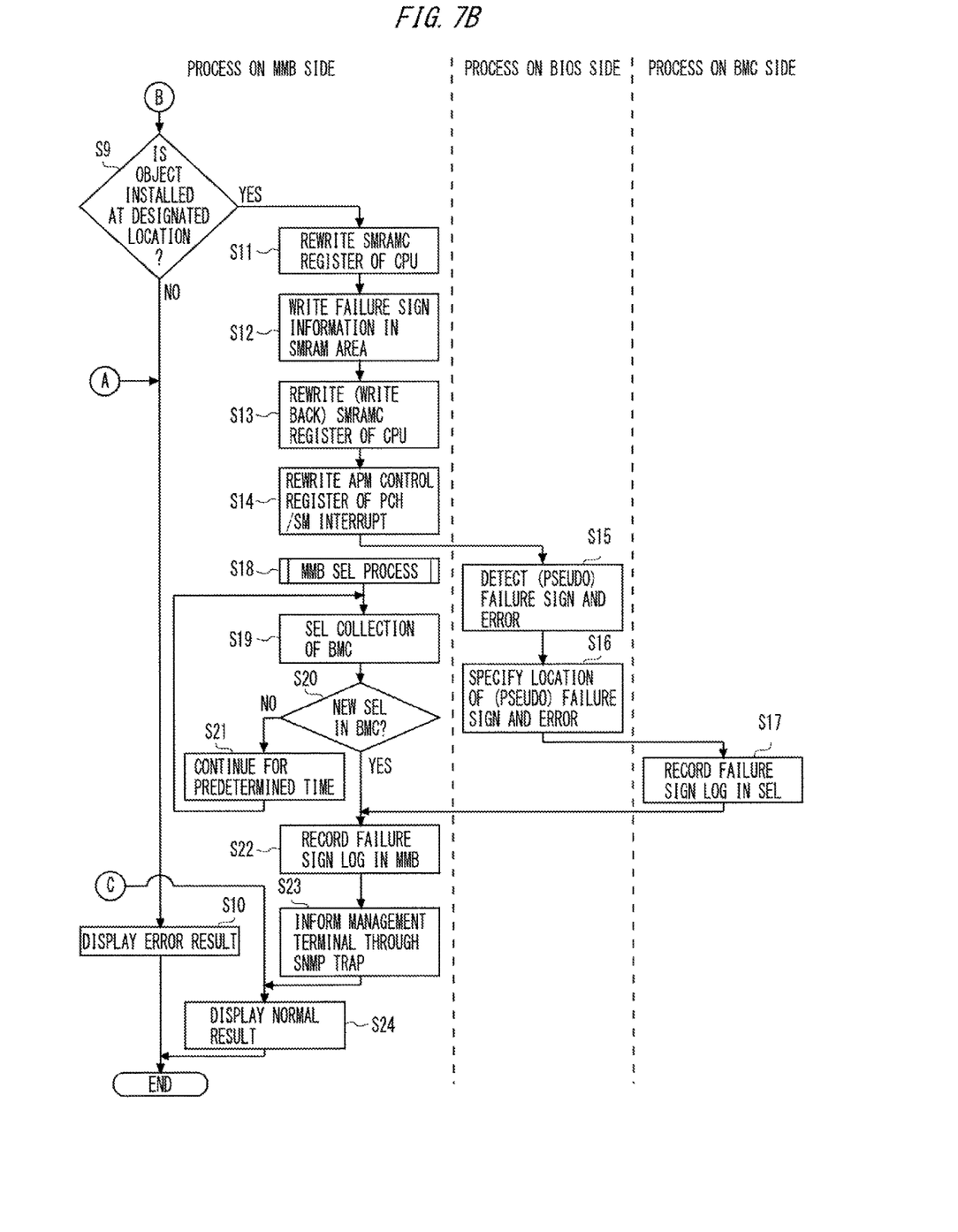
FIG. 7B is a flowchart illustrating a process for the pseudo failure sign generation command.

FIGS. 7A and 7B are flowcharts illustrating processes for the pseudo failure sign generation command. FIG. 7A illustrates the process of the MMB 11, and FIG. 7B illustrates the processes of the MMB 11, the BIOS and the BMC 107. To start with, the MMB 11 accepts the command (S1). The process in S1 corresponds to the arrow line A1 in FIGS. 4 and 5. The process in S1 is one example of "accepting a command designating a pseudo failure generating location to generate the pseudo failure from an external device connected to a management computer". Next, the MMB 11 determines whether the accepted command is the pseudo failure sign generation command.

When the accepted command is the pseudo failure sign generation command, the MMB 11 checks the location (which is also termed component on-board locating information) designated by the command against on-board information retained by the MMB 11 (S3). The MMB 11 determines whether the component designated by the command is actually installed on the information processing apparatus 1. The designated components is any one of the DIMM (YES in S4), the CPU (YES in S5) and the I/O unit (YES in S6), in which case the MMB 11 advances to a process in S9. The I/O unit is simply called the I/O. Whereas when the designated component corresponds to none of the components in S4 through S6, the MMB 11 advances to a process in S10.

The MMB 11 determines in the process of S9 whether the component specified at the location designated by the command is installed. It is confirmed based on the on-board information retained by the MMB 11 whether the component specified at the designated location is installed. When confirmed (YES in S9), the MMB 11 rewrites the SMRAMC register of the CPU 101, and sets a D_OPEN bit. As described above, when the D_OPEN bit of the SMRAM control register is set to "1", the transfer destination of the memory access is changed to the SMRAM area. The processes in S3 through S6, S9 and S11 correspond to the arrow line A2 in FIGS. 4 and 5, and the process in S11 is one example of "shifting the processor to a system management mode".

Next, the MMB 11 writes the pseudo failure sign information to the SMRAM area (S12). The process in S12 corresponds to the arrow line A3 in FIGS. 4 and 5. The process in S12 is one example of "setting information indicating a pseudo failure in a system space".

The MMB 11 rewrites the SMRAMC register of the CPU 101, and resets the D_OPEN bit (S13). The process in S13 disables the MMB 11 from accessing the SMRAM area. The process in S13 corresponds to the arrow line A4 in FIGS. 4 and 5. The process in S13 is one example of "shifting the processor to the non system management mode from the system management mode".

The MMB 11 sets an APM control port register of the PCH 104, and generates the SMI (interrupt) (S14). The process in S14 corresponds to the arrow line A5 in FIGS. 4 and 5. The process in S14 is one example of "causing the processor to generate an interrupt corresponding to the pseudo failure".

Then, the control is handed over to the SMI handler 106 within the BIOS, and the failure (pseudo failure sign or pseudo sign) is detected (S15). The SMI handler 106 searches the SMRAM area, and thus identifies the pseudo failure location or the pseudo sign location (S16). The process in S16 corresponds to the arrow line A6 in FIGS. 4 and 5. The SMI handler 106 causes the BMC 107 to record the failure sign log in the SEL within the BMC 107 (S17). The process in S17 corresponds to the arrow line 7 in FIGS. 4 and 5. The SMI handler 106 finishes processing.

On the other hand, the MMB 11 periodically collects the SELs of the BMC 107 (S18, S19, S20, S21). The MMB 11 acquires the failure sign log within the BMC 107, and the records the acquired log in the self-SEL (S22). The processes in S18 through S22 correspond to the arrow line A8 in FIGS. 4 and 5. The processes in S18 through S22 are one example of "acquiring failure information output by an interrupt handler started up upon an interrupt". The MMB 11 informs the management terminal 2 of the pseudo failure sign through the SNMP trap (S23). The process in S23 corresponds to the arrow line A9 in FIGS. 4 and 5. The process in S23 is one example of "notifying the external device of the acquired failure information". The MMB 11 displays a result of a normal finish of the command on the management terminal 2 (S24).

Whereas when determining in S2 of FIG. 7A that the accepted command is not the pseudo failure sign generation command, the MMB 11 runs other commands. Namely, the commands other than the pseudo failure sign generation command can be inputted on the command prompt of the MMB 11. When the inputted command is not the pseudo failure sign generation command as given in FIG. 6, the MMB 11 executes the process corresponding to the inputted command. When the command is normally finished, the MMB 11 displays a result of the normal finish of the command on the management terminal 2 (S24). Whereas when the command is abnormally finished, the MMB 11 goes to the process in S10.

When determining in S9 of FIG. 7B that the component specified at the designated location is not installed, the MMB 11 advances to the process in S10. The MMB 11 displays an error result. After the processes in S10 and S24, the MMB 11 finishes processing.

Effect of Embodiment

The MMB 11 in the embodiment records the pseudo failure sign information in the SMRAM area. The pseudo failure sign information contains, e.g., the pseudo failure sign target component, the location, a content of the error and other equivalent items as the information processable by the SMI handler 106. The MMB 11 starts up the SMI handler 106 of the BIOS though the SMI. The process after starting up the SMI handler 106 is the original error process of the server 1, and hence the MMB 11 can put the pseudo failure sign into the original failure or failure sign monitoring mechanism of the server 1. To be specific, when the CPU 101 of the server 1 detects the failure, the failure information is written to the SMRAM area, and the SMI handler 106 processes the failure information. Such a failure process does not depend on the usage environment, instanced by the OS, of the server 1, and the MMB 11 can generate the pseudo failure sign without depending on the usage environment of the server 1.

As in the case of the management terminal 2, there is provided the mechanism to issue the pseudo failure sign generation command to the MMB 11, thereby enabling the administrator to generate the pseudo failure or the pseudo sign from on the management terminal 2 without depending on the physical dedicated equipment and the usage environment ((Operating System (OS)). Accordingly, the administrator, as far as being able to comprehend a command using method, depends on less of the technical knowledge about the error processing inside the CPU 101 and the technical operation skill to handle the dedicated equipment instanced by the failure generation circuit for each component.

The mechanism to issue the pseudo failure sign generation command is not confined in terms of the usage location and is therefore usable even at the system developing site like the user site, whereby the MMB 11 to generate the pseudo failure sign can be universally utilized.

In the embodiment, the pseudo failure generating target component and the location are designated by the pseudo failure sign generation command. The MMB 11 accepts the pseudo failure sign generation command and is thereby enabled to generate the pseudo failure sign in the component desired by the administrator and the operator each performing the verifying operation at the desired location.

In the embodiment, the MMB 11 acquires the failure sign log in the BMC 107, which is output via the BIOS from the SMI handler 106, in the processes of S18 through S22 in FIG. 7B. Accordingly, in addition to generating the pseudo failure sign, the MMB 11 can further verify the monitoring mechanism as the contrivance for monitoring the pseudo failure sign in the server 1.

In the embodiment, the MMB 11 can notify the management terminal 2 of the collected pieces of pseudo failure sign information through, e.g., the SNMP trap, and can properly report the pseudo failure sign information to the administrator and other equivalent persons of the vendor, who carry out the operation at the user site.

As described above, when the information processing apparatus is equipped with a general purpose component manufactured by a specialized maker as instanced by a general purpose x86 series processor of Intel Corporation, each component does not have an equipment or a contrivance like a pseudo failure generation circuit in many cases. Even supposing that the equipment or the contrivance for generating the pseudo failure or the pseudo sign of failure is provided, an interface is different per component, and it is presumed that an algorithm for generating the pseudo failure and sign becomes different. When the interface is different per component and when the algorithm for generating the pseudo failure and sign becomes different, it follows that the operator and other equivalent persons are desired to have technical knowledge for generating the pseudo failure and sign. Accordingly, when the information processing apparatus equipped with the general purpose component manufactured by the specialized maker is once set up outside a vendor's site of the information processing apparatus, it is difficult to simply generate the pseudo failure or the pseudo sign of failure as the case may be.

Further, a plurality of OSs is usable in the general purpose processor like the x86 series processor, and hence a desirable contrivance is a contrivance for generating the pseudo failure or the pseudo sign of failure without depending on the usage environment instanced by the OS and other equivalent environments.

Such being the case, it is an aspect of the information system of the embodiment to provide a technology capable of generating a pseudo failure or a pseudo sign of failure simply and universally without depending on a physical dedicated equipment and a usage environment in an information processing apparatus equipped with components like general purpose components.

According to the program, it is feasible to generate the pseudo failure or the pseudo sign of failure simply and universally without depending on the physical dedicated equipment and the usage environment in the information processing apparatus equipped with components like general purpose components.

Non-Transitory Computer-Readable Recording Medium

A program for making a computer, other machines and devices (which will hereinafter be referred to as the computer etc) realize any one of the functions can be recorded on a non-transitory recording medium readable by the computer etc. Then, the computer etc is made to read and execute the program on this recording medium, whereby the function thereof can be provided.

Herein, the recording medium readable by the computer etc connotes a recording medium capable of accumulating information such as data and programs electrically, magnetically, optically, mechanically or by chemical action, which can be read by the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer. Further, a hard disc, a ROM (Read-Only Memory), etc are given as the recording mediums fixed within the computer etc. Further, SSD (Solid State Drive) is usable as any of the recording mediums removable from the computer etc. and the recording mediums fixed within the computer etc.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A computer readable non-transitory recording medium having stored therein a program for generating a pseudo failure in an information processing apparatus including a processor and components and configured to record an occurrence of failure in any one of the processor and the components connected to the processor in a system space accessible in a system management mode and to notify the occurrence of the failure to an interrupt handler by an interrupt, the program causing a management computer configured to manage the information processing apparatus to execute:

shifting the processor to the system management mode;
setting information indicating a pseudo failure in the system space, the information including elements for the interrupt handler to specify which component the pseudo failure exists in and what kind of the pseudo failure occurs;
shifting the processor to a non system management mode from the system management mode after the setting; and
causing the processor to generate the interrupt corresponding to the pseudo failure.

2. The program according to claim 1, further causing the management computer to execute acquiring failure information output by the interrupt handler started up by the interrupt.

3. The program according to claim 1, further causing the management computer to execute accepting a command designating a pseudo failure generating location to generate the pseudo failure from an external device connected to the management computer, and notifying the external device of failure information.

4. A pseudo failure generation method for generating a pseudo failure in an information processing apparatus including a processor and components and configured to record an occurrence of failure in any one of the processor and the components connected to the processor in a system space accessible in a system management mode and to notify the occurrence of the failure to an interrupt handler by an interrupt, the pseudo failure generation method executed by a management computer managing the information processing apparatus, comprising:

shifting the processor to the system management mode;
setting information indicating a pseudo failure in the system space, the information including elements for the interrupt handler to specify which component the pseudo failure exists in and what kind of the pseudo failure occurs;
shifting the processor to a non system management mode from the system management mode after the setting; and
causing the processor to generate the interrupt corresponding to the pseudo failure.

5. A pseudo failure generation apparatus in an information processing apparatus including a processor and components and configured to record an occurrence of failure in any one of the processor and the components connected to the processor in a system space accessible in a system management mode and to notify the occurrence of the failure to an interrupt handler by an interrupt, the pseudo failure generation apparatus including another processor configured to execute a process comprising:

shifting the processor to the system management mode;
setting information indicating a pseudo failure in the system space, the information including elements for the interrupt handler to specify which component the pseudo failure exists in and what kind of the pseudo failure occurs;
shifting the processor to a non system management mode from the system management mode after the setting; and
causing the processor to generate the interrupt corresponding to the pseudo failure.

* * * * *